(12) United States Patent
Hsu et al.

(10) Patent No.: US 10,665,932 B2
(45) Date of Patent: May 26, 2020

(54) CONTROL PANEL AND RADIATION DEVICE USING THE SAME

(71) Applicant: InnoLux Corporation, Miao-Li County (TW)

(72) Inventors: Min-Ya Hsu, Miao-Li County (TW); Chung-Kuang Wei, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 14 days.

(21) Appl. No.: 16/000,282

(22) Filed: Jun. 5, 2018

(65) Prior Publication Data

US 2019/0013571 A1 Jan. 10, 2019

Related U.S. Application Data

(60) Provisional application No. 62/528,999, filed on Jul. 6, 2017.

(30) Foreign Application Priority Data

Jan. 3, 2018 (CN) .......................... 2018 1 0004599

(51) Int. Cl.
*G02F 1/135* (2006.01)
*H01Q 1/36* (2006.01)
(Continued)

(52) U.S. Cl.
CPC ............. *H01Q 1/36* (2013.01); *H01Q 1/2283* (2013.01); *H01Q 3/44* (2013.01);
(Continued)

(58) Field of Classification Search
CPC .. G06F 1/1601; G02F 2203/12; G02F 1/0316; G02F 1/1343; G02F 1/134309; G02F 1/155; G02F 2001/1557; G02F 2201/12; G02F 1/133305; G02F 1/136277; G02F 2001/133302; G02F 2001/133354; G02F 2001/133368; G02F 2201/56; G03G 5/043; G03G 5/06; G03H 2001/0224;
(Continued)

(56) References Cited

U.S. PATENT DOCUMENTS 6,600,473 B1 * 7/2003 Kobayashi ............ G02F 1/1354
345/204
2007/0134883 A1 6/2007 Lee et al.
(Continued)

FOREIGN PATENT DOCUMENTS

EP 1 055 960 A2 11/2000
WO 2017/065255 A1 4/2017

OTHER PUBLICATIONS

European Search Report dated Dec. 3, 2018, issued in application No. 18177772.3.

*Primary Examiner* — Binh B Tran
(74) *Attorney, Agent, or Firm* — McClure, Qualey & Rodack, LLP

(57) ABSTRACT

A radiation device includes a control panel having an active area. The control panel includes: a modulation unit disposed in the active area, and an ion attraction unit, wherein the ion attraction unit is disposed corresponding to the modulation unit, and the ion attraction unit and the modulation unit are electrically insulated.

18 Claims, 12 Drawing Sheets

(51) Int. Cl.
*H01Q 1/22* (2006.01)
*H01Q 3/44* (2006.01)
*H01Q 15/00* (2006.01)
*G02F 1/1343* (2006.01)
*G03H 1/02* (2006.01)
*G03G 5/043* (2006.01)
*G06F 1/16* (2006.01)
*G03G 5/06* (2006.01)
*G02F 1/1333* (2006.01)
*G02F 1/03* (2006.01)

(52) U.S. Cl.
CPC ....... *H01Q 15/0066* (2013.01); *G02F 1/0316* (2013.01); *G02F 1/133305* (2013.01); *G02F 2203/12* (2013.01); *G03G 5/043* (2013.01); *G03G 5/06* (2013.01); *G03H 2001/0224* (2013.01); *G06F 1/1601* (2013.01)

(58) Field of Classification Search
CPC .... G09G 2300/0421; G09G 2300/0426; H01L 21/02367; H01L 27/12; H01L 27/1203; H01L 27/1218
USPC ........ 361/678.21; 349/25, 30, 139, 143, 158
See application file for complete search history.

(56) References Cited

U.S. PATENT DOCUMENTS

2016/0261043 A1  9/2016 Sazegar et al.
2017/0025082 A1  1/2017 Kobayashi et al.
2018/0330678 A1* 11/2018 Zhao .................... G09G 3/3607

\* cited by examiner

CONTROL PANEL AND RADIATION DEVICE USING THE SAME

CROSS REFERENCE TO RELATED APPLICATIONS

This application claims the benefit of U.S. Provisional Application No. 62/528,999 filed Jul. 6, 2017, the entirety of which is incorporated by reference herein.

This Application claims priority of China Patent Application No. 201810004599.4, filed on Jan. 3, 2018, the entirety of which is incorporated by reference herein.

BACKGROUND OF THE INVENTION

Field of the Invention

The present disclosure relates to an electronic device, and in particular to a high-frequency radiation device including liquid crystals.

Description of the Related Art

Radiation devices may contain or generate mobile ions due to their material composition, manufacturing processes, testing procedures, or prolonged operation, and this may cause interference to the operation of the radiation device.

Therefore, reducing the number of mobile ions in the radiation device or enhancing the performance of the radiation device is a goal that urgently needed to be addressed.

BRIEF SUMMARY OF THE INVENTION

A detailed description is given in the following embodiments with reference to the accompanying drawings.

The disclosure provides a radiation device, including a control panel having an active area and a non-active area. The control panel includes a first modulation unit disposed in the active area, and an ion attraction unit disposed in at least one of the active area and the non-active area. The ion attraction unit is electrically insulated from the first modulation unit.

The disclosure provides a control panel including an active area, a non-active area, a first modulation unit, and an ion attraction unit. The first modulation unit is disposed in the active area. The ion attraction unit disposed in at least one of the active area and the non-active area. The ion attraction unit is electrically insulated from the first modulation unit.

The control panel and the radiation device using the same of the present disclosure may utilize an ion attraction unit to attract mobile ions thereby reducing the interference of the mobile ions during the operation of the radiation device to enhance the performance of the radiation device

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
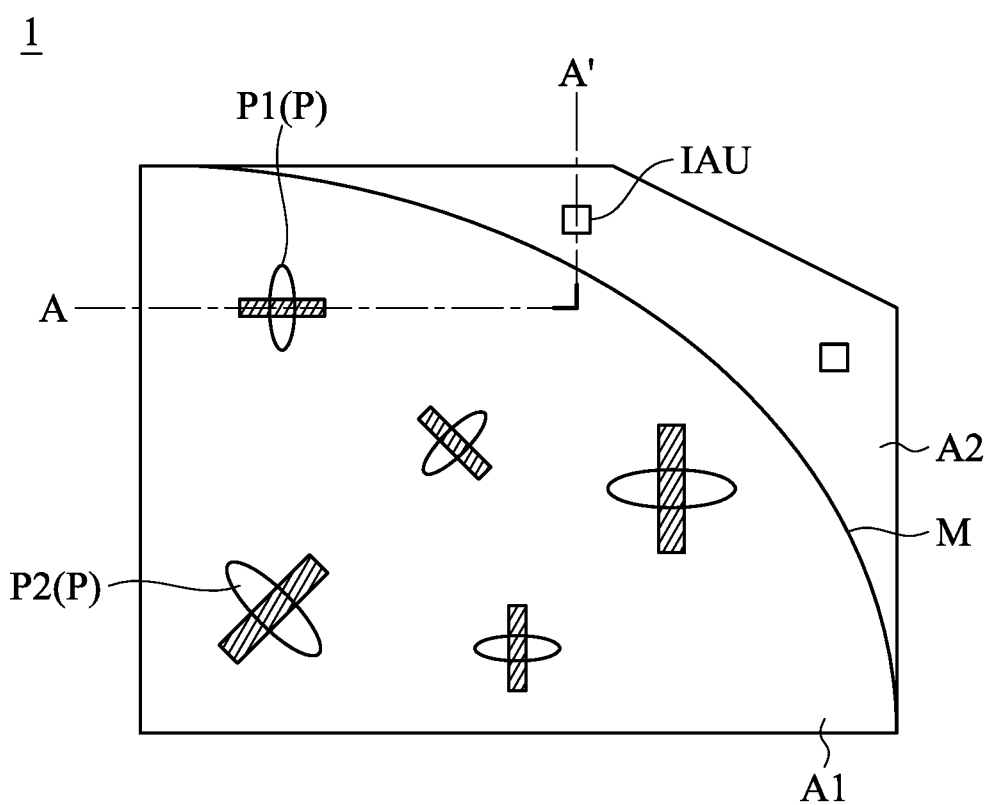
FIG. 1 is a schematic top view of a control panel of a radiation device according to Embodiment 1 of the present disclosure.

The following description provides many different embodiments, or examples, for implementing different features of the disclosure. Elements and arrangements described in the specific examples below are merely used for the purpose of concisely describing the present disclosure and are merely examples, which are not intended to limit the present disclosure. For example, the description of a structure in which a first feature is on or above a second feature includes that the first feature and the second feature are in direct contact with each other or there is another feature disposed between the first feature and the second feature such that the first feature and the second feature are not in direct contact.

The terms "first" and "second" of this specification are used only for the purpose of clear explanation and are not intended to limit the scope of the patent. In addition, terms such as "the first feature" and "the second feature" are not limited to the same or different features.

Spatially related terms, such as upper or lower, are used herein merely to describe briefly the relationship of one element or feature to another element or feature in the drawings. In addition to the directions described in the drawings, there are devices that are used or operated in different directions.

In addition, the first element perpendicular to the second element described in this specification is not limited to that an angle between the first element and the second element is 90 degrees. An acceptable range of tolerance is further included, for example, the angle between the first element and the second elements is between 85 degrees to 95 degrees. The first element parallel to the second element described in this specification is not limited to that an angle between the first element and the second element is 0 degrees. An acceptable range of tolerance is further included, for example, the angle between the first element and the second element is between −5 degrees to 5 degrees.

The shapes, dimensions, and thicknesses in the drawings may not be scaled or be simplified for clarity of illustration, and are provided for illustrative purposes only.

Figure 2A:
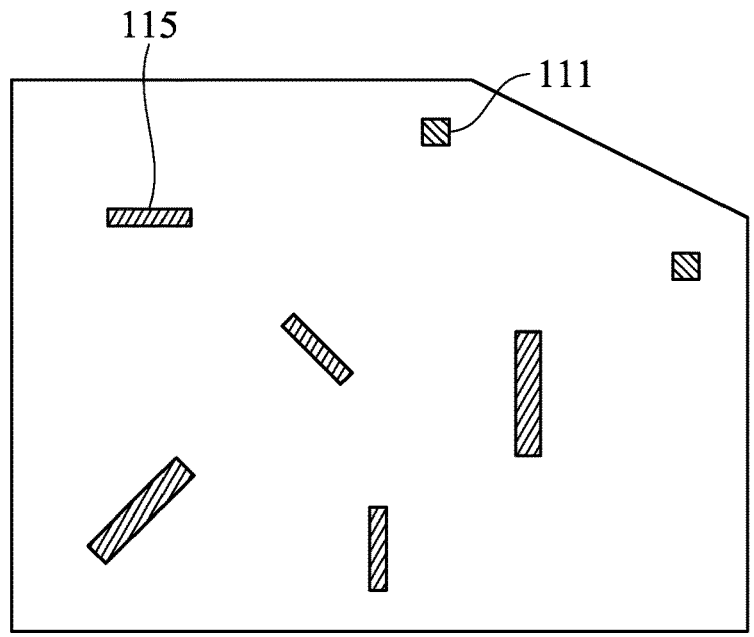
FIG. 2A is a schematic top view of a first substrate of the control panel of the radiation device according to Embodiment 1 of the present disclosure.
Figure 2B:
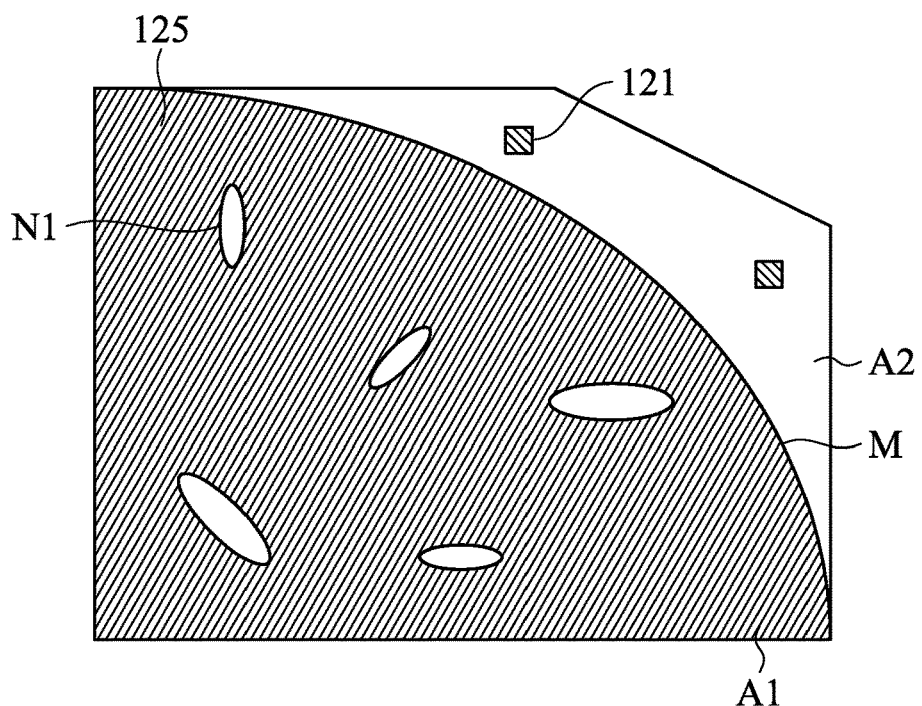
FIG. 2B is a schematic top view of the second substrate of the control panel of the radiation device according to Embodiment 1 of the present disclosure.
Figure 3:
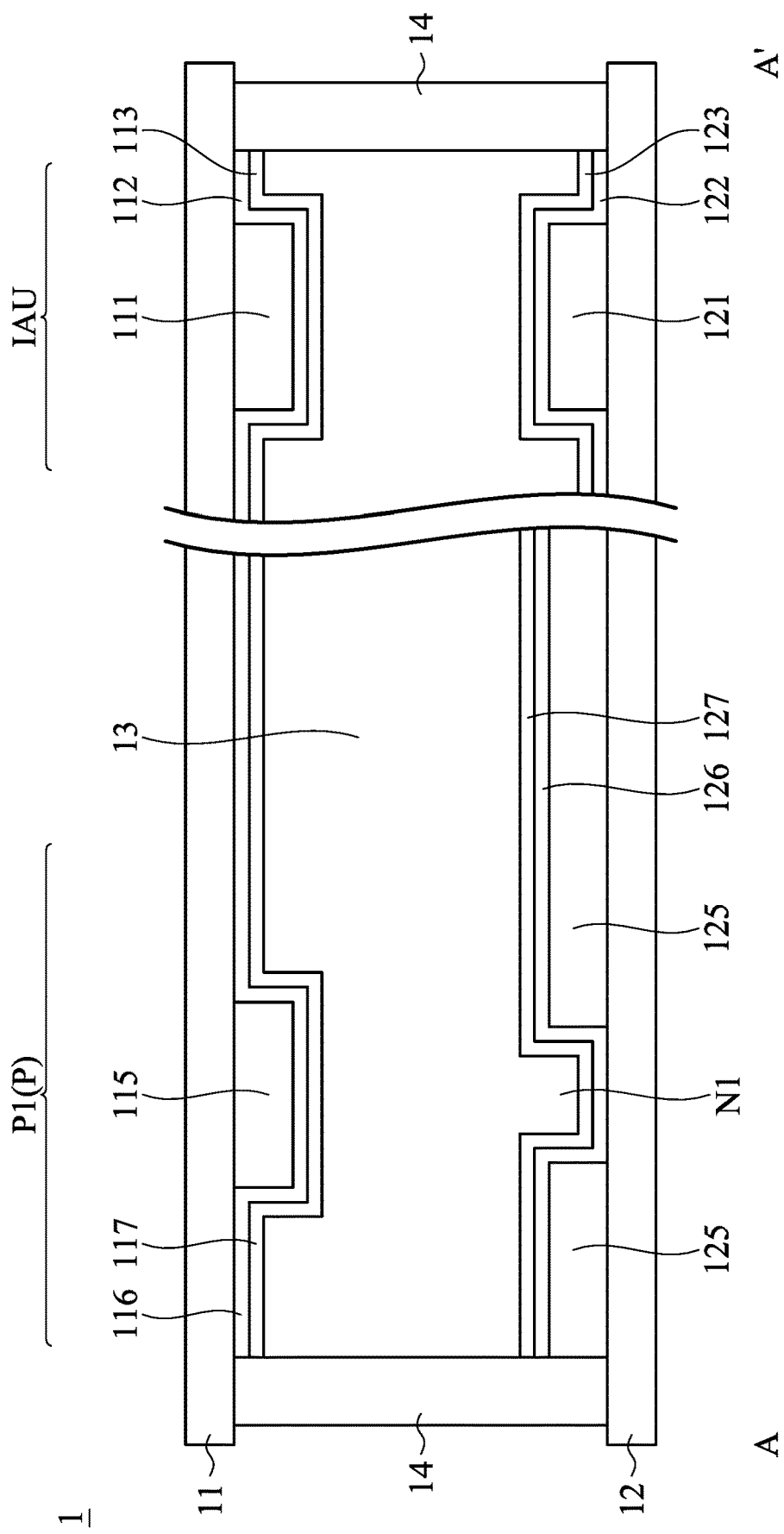
FIG. 3 is a sectional view taken along line A-A' of the control panel of the radiation device according to Embodiment 1 of the present disclosure.

Please refer to FIG. 1 to FIG. 3. FIG. 1 is a schematic top view of a control panel 1 of a radiation device according to Embodiment 1 of the present disclosure. FIG. 2A is a schematic top view of a first substrate 11 of the control panel 1 of the radiation device according to Embodiment 1 of the present disclosure. FIG. 2B is a schematic top view of the second substrate 12 of the control panel 1 of the radiation device according to Embodiment 1 of the present disclosure. FIG. 3 is a sectional view taken along line A-A' of the control panel 1 of the radiation device according to Embodiment 1 of the present disclosure. The radiation device of the present disclosure may operate in a high frequency range, for example, a liquid-crystal antenna operates at a high frequency, but the present disclosure is not limited thereto. The high frequency range is, for example, greater than or equal to 1 GHz and less than or equal to 80 GHz (1 GHz high frequency 80 GHz). The radiation device can include a control panel 1. The control panel 1 may include a dielectric layer 13 and a modulation unit array composed of a plurality of modulation units P. Each modulation unit P is controlled by an electrical signal so that different dielectric constants are obtained by different arrangements of the media (e.g., liquid-crystal molecules) corresponding to each modulation unit P. Therefore, the phase of the wireless signal transmitted or received by each modulation unit P can be controlled so as to affect the forward direction of the wave front radiated from the modulation unit array, that is, for example, the radiation direction emitted or received by the antenna. The above-mentioned modulation unit P includes a first modulation unit P1 and a second modulation unit P2 of different sizes for different functions of transmitting or receiving. The control panel 1 of the radiation device has an active area A1 and a non-active area A2, which is arranged adjacent to the active area A1. In FIG. 1, the active area A1 and the non-active area A2 are represented by a virtual boundary line M. In Embodiment 1, the modulation unit P may be disposed in the active area A1, and the non-active area A2 may be provided with an ion attraction unit IAU. In some embodiments of the present disclosure, at least one modulation unit P may be disposed in the active area A1, and at least one ion attraction unit IAU may be disposed in the non-active area A2, but the disclosure is not limited thereto. In some embodiments of the present disclosure, the ion attraction unit IAU may be disposed correspondingly to the modulation unit P, and the ion-attraction unit IAU may be electrically insulated from the modulation unit P. In some embodiments of the present disclosure, the virtual boundary line M may be substantially defined by the range of the metal layer (the second electrode 125) on the second substrate 12 (as shown in FIG. 2B). In other embodiments of the present disclosure, the virtual boundary line M may be substantially defined by the arrangement position of the modulation units P. For example, the modulation units P may be densely arranged in an area, and the boundary of this area may be defined as the virtual boundary line M.

The control panel 1 may include a first substrate 11, a second substrate 12, and a dielectric layer 13. The first substrate 11 may be disposed opposite to the second substrate 12, and the dielectric layer 13 may be disposed between the first substrate 11 and the second substrate 12. The first substrate 11 and the second substrate 12 can maintain the gap therebetween with spacers 14. In an embodiment, the first substrate 11 and the second substrate 12 may be formed of substrates that do not absorb (or absorb only trace amounts of) radiation in the frequency range in which the radiation device operates. For example, a substrate that does not absorb (or only absorb trace amounts of) high-frequency radiation, such as, but not limited to, a glass substrate or other suitable material. In an embodiment, the dielectric layer may include a material with high birefringence (such as liquid crystal), but not limited thereto.

The ion attraction unit IAU may include a first attraction electrode 111 and a second attraction electrode 121. The modulation unit P may include a first electrode 115 and a second electrode 125. In an embodiment, a first attraction electrode 111 may be disposed on the first substrate 11, a first insulating layer 112 may be disposed on the first attraction electrode 111, and a first alignment layer 113 may be disposed on the first insulating layer 112. In other words, the first alignment layer 113 may be disposed on a surface of the first substrate 11 adjacent to the dielectric layer 13, the first attraction electrode 111 may be disposed between the first substrate 11 and the first alignment layer 113, and the first insulating layer 112 may be disposed between the first attraction electrode 111 and the first alignment layer 113. In other embodiments, other layers may be added to or between the above layers as the case may be, but not limited thereto. In an embodiment, a first electrode 115 may be disposed on the first substrate 11, a third insulating layer 116 may be disposed on the first electrode 115, and a third alignment layer 117 may be disposed on the third insulating layer 116. In other words, the third alignment layer 117 may be disposed on the surface of the first substrate 11 adjacent to the dielectric layer 13, the first electrode 115 may be disposed between the first substrate 11 and the third alignment layer 117, and the third insulating layer 116 may be disposed between the first electrode 115 and the third alignment layer 117. In other embodiments, other layers may be added to or between the above layers as the case may be, but not limited thereto. In an embodiment, a second attraction electrode 121 may be disposed on the second substrate 12, a second insulating layer 122 may be disposed on the second attracting electrode 121, and a second alignment layer 123 may be disposed on the second insulating layer 122. In other words, the second alignment layer 123 may be disposed on a surface of the second substrate 12 adjacent to the dielectric layer 13, the second attraction electrode 121 may be disposed between the second substrate 12 and the second alignment layer 123, and the second insulating layer 122 may be disposed between the second attraction electrode 121 and the second alignment layer 123. In other embodiments, other layers may be added to or between the above layers as the case may be, but not limited thereto. In some embodiments, the first attraction electrode 111 and the second attraction electrode 121 overlap in a normal direction of the first substrate 11. In some embodiments, the first attraction electrode 111 and the second attraction electrode 121 at least partially overlap in the normal direction of the first substrate 11. In an embodiment, a second electrode 125 may be disposed on the second substrate 12, a fourth insulating layer 126 may be disposed on the second electrode 125, and a fourth alignment layer 127 may be disposed on the fourth insulating layer 126. In other words, the fourth alignment layer 127 may be disposed on the surface of the second substrate 12 adjacent to the dielectric layer 13, the second electrode 125 may be disposed between the second substrate 12 and the fourth alignment layer 127, and the fourth insulating layer 126 may be disposed between the second electrode 125 and the fourth alignment layer 127. In other embodiments, other layers may be added to or between the above layers as the case may be, but not limited thereto. In some embodiments, the first electrode 115 and the second electrode 125 overlap in the normal direction of the first substrate 11. In some embodiments, the first electrode 115 and the second electrode 125 partially overlap in the normal direction of the first substrate 11. The second electrode 125 may be formed of, for example, a metal layer, and the second electrode 125 may respectively have an opening at a position corresponding to the ion attraction unit IAU and the modulation unit P. In an embodiment, the second electrode 125 may have a first opening N1, the first opening N1 corresponds to the first electrode 115 of the modulation unit P, and the first opening N1 and the first electrode 115 overlap in the normal direction of the first substrate 11. In this embodiment, the first opening N1 and the first electrode 115 partially overlap in the normal direction of the first substrate 11.

Although the wires of the ion attraction units IAU are not shown in FIGS. 1 to 3, there are actually wires connected to the first attraction electrode 121 and/or the second attraction electrode 121 of the ion attraction unit IAU. These wires are used to provide the voltage required for the ion attraction unit IAU to generate an electric field that attracts ions. The plurality of ion attraction units IAU can be connected in series and supplied with voltage, or can be supplied with voltage independently, depending on product requirements and specifications.

In the structure of Embodiment 1, the first electrode 115 and the second electrode 125 may be highly conductive metals (for example, gold, silver, copper, etc.), alloys of the above materials, or other suitable materials, but not limited thereto. The first electrode 115 and the second electrode 125 may also be formed by stacking different metals, for example, a structure in which copper and molybdenum are stacked. The number of layers or the material thereof are only examples, but not limited thereto. As the first attraction electrode 111 and the second attraction electrode 121, the same material as the first electrode 115 and the second electrode 125 may be used, or different materials may be used. For example, the first attraction electrode 111 and the second attraction electrode 121 may be formed of transparent electrodes using indium tin oxide (ITO). In this embodiment, the first attraction electrode 111 and the second attraction electrode 121 may have a smaller thickness than the metal electrode, but not limited thereto. The first attraction electrode 111 and the second attraction electrode 121 may be formed by the same process as the first electrode 115 and the second electrode 125, or may be formed by different processes, but not limited thereto.

In the structure of Embodiment 1, the first insulating layer 112 and the third insulating layer 116 are represented by different symbols, but both may be the same insulating layer formed by the same material or process, or different insulating layers formed by different materials or process, which is not limited in the present disclosure. Similarly, the second insulating layer 122 and the fourth insulating layer 126 are represented by different symbols, but both may be the same insulating layer formed by the same material or process, or different insulating layers formed by different materials or process, which is not limited in the present disclosure.

In the structure of Embodiment 1, the first alignment layer 113, the second alignment layer 123, the third alignment layer 116, and the fourth alignment layer 127 may include, for example, polyimide (PI). In other embodiments, the first alignment layer 113, the second alignment layer 123, the third alignment layer 116, and the fourth alignment layer 127 may include other suitable materials, but not limited thereto. The first alignment layer 113 and the third alignment layer 117 are represented by different symbols, but both may be the same insulating layer formed by the same material or process, or different insulating layers formed by different materials or process, which is not limited in the present disclosure. Similarly, the second alignment layer 123 and the fourth alignment layer 127 are represented by different symbols, but both may be the same insulating layer formed by the same material or process, or different insulating layers formed by different materials or process, which is not limited in the present disclosure.

Referring to FIGS. 1 and 3, the first electrodes 115 formed on the first substrate 11 and the second electrode 125 formed on the second substrate 12 are partially overlapped in a normal direction of the second substrate 12. The first electrodes 115 and the openings of the metal layer on the second substrate 12 partially overlap in the normal direction of the second substrate 12. The modulation unit P controls the arrangement of the medium (for example, liquid-crystal molecules) between the sites where the first electrode 115 and the second electrode 125 overlap to generate different dielectric constants, such as to adjust the phase of the wireless signal transmitted or received by the modulation unit P. The radiation device can adjust the radiation direction of the overall wireless signal by controlling the phases of the wireless signals with the plurality of modulation units P. The direction is, for example, the radiation direction emitted or received by the antenna.

In an embodiment, during the manufacturing process, the testing process or the operation of the control panel 1, the mobile ions are easily generated in the steps of heating, lighting, or prolonged operation. There may also be mobile ions in the material of the dielectric layer 13. Those charged ions will affect the performance of the control panel 1 in operation. Therefore, in Example 1, the ion attraction unit IAU can be operated after the step that may generate mobile ions. In an embodiment, the ion attraction unit IAU may operate by applying a DC bias voltage to the first attraction electrode 111 and the second attraction electrode 121 to attract the mobile ions to adhere to, for example, the first alignment layer 113 and/or the second alignment layer 123 or attract the mobile ions away from the modulation unit P to reduce the interference. The ion attraction unit IAU may be stopped by removing the DC bias voltage between the first attraction electrode 111 and the second attraction electrode 121. At this moment, most of the ions may still adhere to the first alignment layer 113 and/or the second alignment layer 123, and only a small portion of the ions will return to the dielectric layer 13. The number of mobile ions can be effectively reduced by operating the ion attraction unit IAU multiple times consecutively or intermittently. Interference caused by the mobile ions during operation of the radiation device can be reduced. In addition, in the present disclosure, the ion attraction unit IAU is operated to attract the mobile ions, which may be performed during the manufacturing, testing of the control panel 1, or after the modulation unit P is operated for a long time. However, it should be noted that the ion attraction unit IAU will only operate when the modulation unit P is not operating. Both will not operate at the same time to avoid interference.

In the configuration of Embodiment 1 described above, it has been described that the ion attraction unit IAU has the first attraction electrode 111 disposed on the first substrate 11 and the second attraction electrode 121 disposed on the second substrate 12. The first attraction electrode 111 and the second attraction electrode 121 are overlapped in the normal direction of the first substrate 11. However, the ion attraction unit of the present disclosure is not limited to the cross-sectional structure of FIG. 3 as long as it can function to attract mobile ions.

Figure 4:
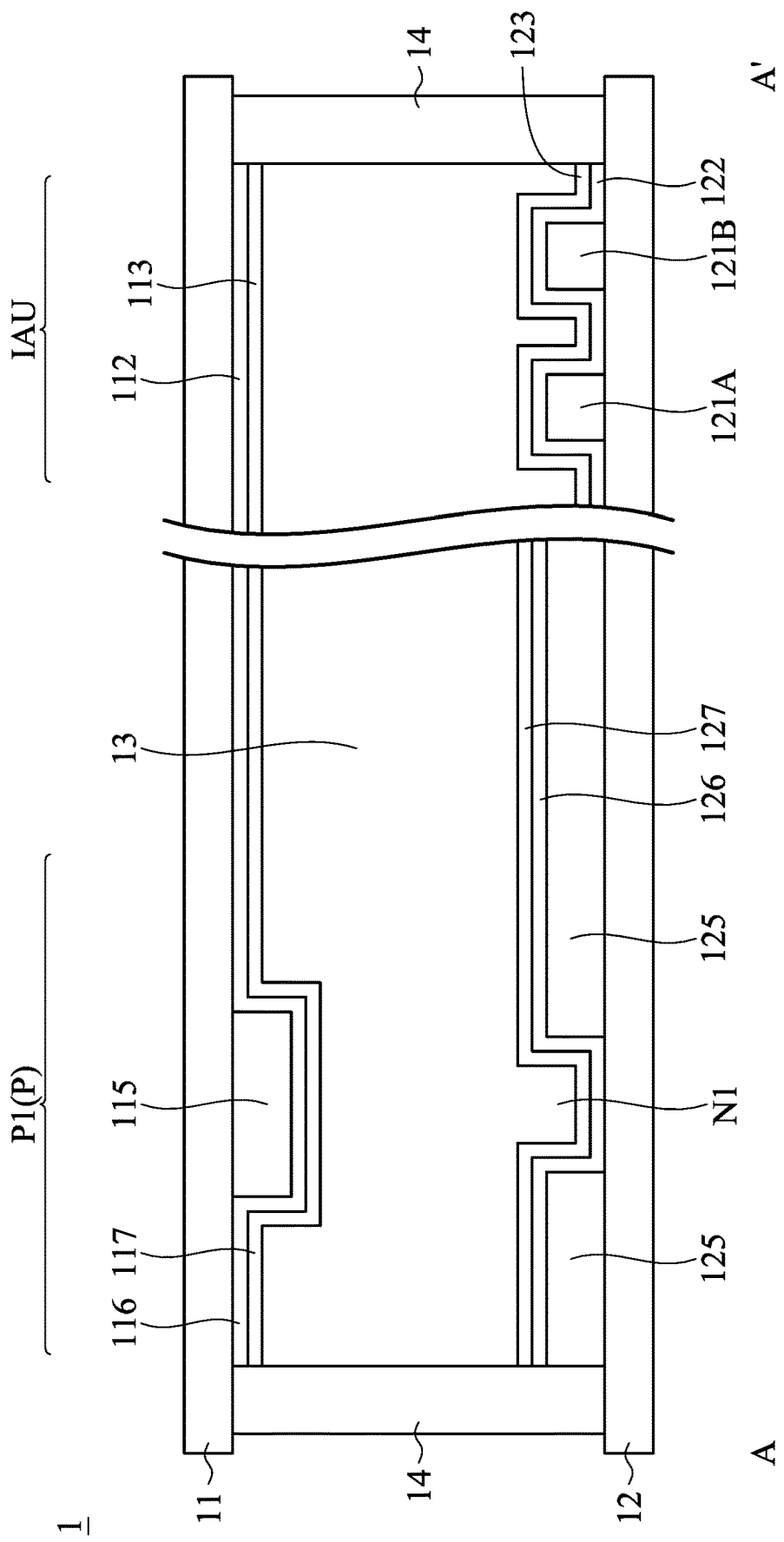
FIG. 4 is a sectional view taken along line A-A' of the control panel of the radiation device according to Modification 1.

FIG. 4 is a sectional view taken along line A-A' of the control panel of the radiation device according to Modification 1. As shown in FIG. 4, in Modification 1, the ion attraction unit IAU includes a first attraction electrode 121A and a second attraction electrode 121B. On the side of the first substrate 11, only the first insulating layer 112 and the first alignment layer 113 are provided, and no electrode is formed. On the side of the second substrate 12, the first attraction electrode 121A and the second attraction electrode 121B are disposed on the second substrate 12 with a gap therebetween, the second insulating layer 122 may be disposed on the first attraction electrode 121A and the second attraction electrode 121B, and the second alignment layer 123 may be disposed on the second insulating layer 122. In other words, the second alignment layer 123 may be disposed on the surface of the second substrate 12 adjacent to the dielectric layer 13, and the first attraction electrode 121A and the second attraction electrode 121B may be disposed between the second substrate 12 and the second alignment layer 123. The second insulating layer 122 may be disposed between the first attraction electrode 121A and the second alignment layer 123 and between the second attraction electrode 121B and the second alignment layer 123. In Modification 1, the effect of attracting surrounding ions can be achieved as well by the transverse electric field generated by the two attraction electrodes on the same side substrate. In addition, the disclosure does not limit two attraction electrodes formed on the second substrate side, and two attraction electrodes may also be formed on the first substrate side.

Figure 5:
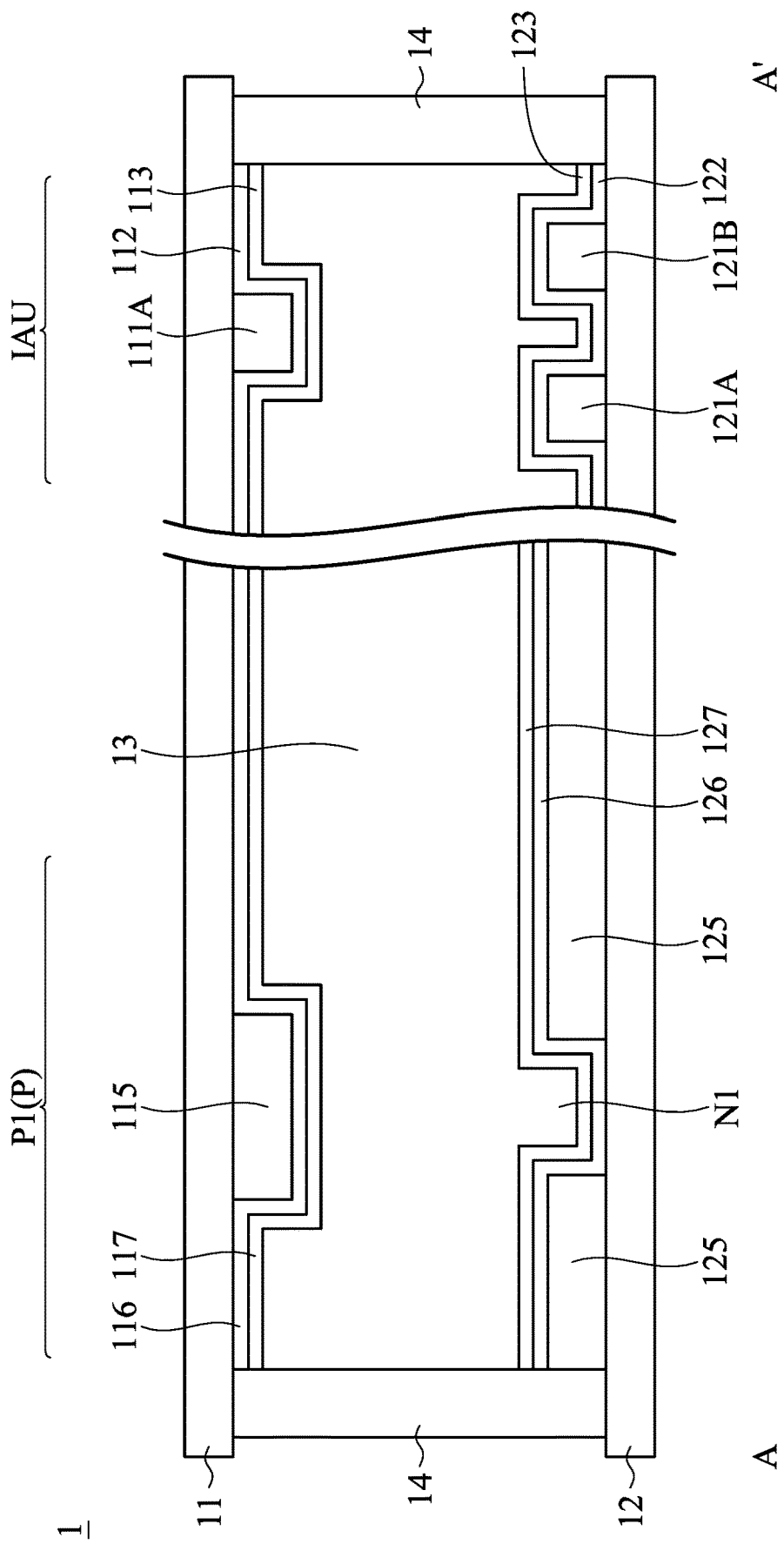
FIG. 5 is a sectional view taken along line A-A' of the control panel of the radiation device according to Modification 2.

FIG. 5 is a sectional view taken along line A-A' of the control panel of the radiation device according to Modification 2. As shown in FIG. 5, in Modification 2, the ion attraction unit IAU includes a first attraction electrode 121A, a second attraction electrode 121B, and a third attraction electrode 111A. The third attracting electrode 111A is formed on a side of the first substrate 11. The first insulating layer 112 may be disposed on the third attraction electrode 111A. The first alignment layer 113 may be disposed on the first insulating layer 112. In other words, the first alignment layer 113 may be disposed on the surface of the first substrate 11 adjacent to the dielectric layer 13, the third attraction electrode 111A may be disposed between the first substrate 11 and the first alignment layer 113, and the first insulating layer 112 may be disposed between the third attraction electrode 111A and the first alignment layer 113. On the side of the second substrate 12, the first attraction electrode 121A and the second attraction electrode 121B are disposed on the second substrate 12 with a gap therebetween, the second insulating layer 122 may be disposed on the first attraction electrode 121A and the second attraction electrode 121B, and the second alignment layer 123 may be disposed on the second insulating layer 122. In other words, the second alignment layer 123 may be disposed on the surface of the second substrate 12 adjacent to the dielectric layer 13, and the first attraction electrode 121A and the second attraction electrode 121B may be disposed between the second substrate 12 and the second alignment layer 123. The second insulating layer 122 may be disposed between the first attraction electrode 121A and the second alignment layer 123 and between the second attraction electrode 121B and the second alignment layer 123. In Modification 2, the electrodes formed on the side of the first substrate 11 and the side of the second substrate 12 are not symmetrical. The effect of attracting the surrounding mobile ions can be achieved by the electric field generated by the three attraction electrodes as well. In addition, the present disclosure does not limit the arrangement or the number of electrodes, as long as the electrodes formed on the side of the first substrate 11 and the side of the second substrate 12 are asymmetrically misaligned. In other embodiments, two attraction electrodes may be formed on the side of the first substrate and one attraction electrode may be formed on the side of the second substrate. Alternatively, one attraction electrode may be formed on the side of the first substrate, one attraction electrode may be formed on the side of the second substrate, and the two electrodes are offset from each other, but the disclosure is not limited thereto.

Figure 6:
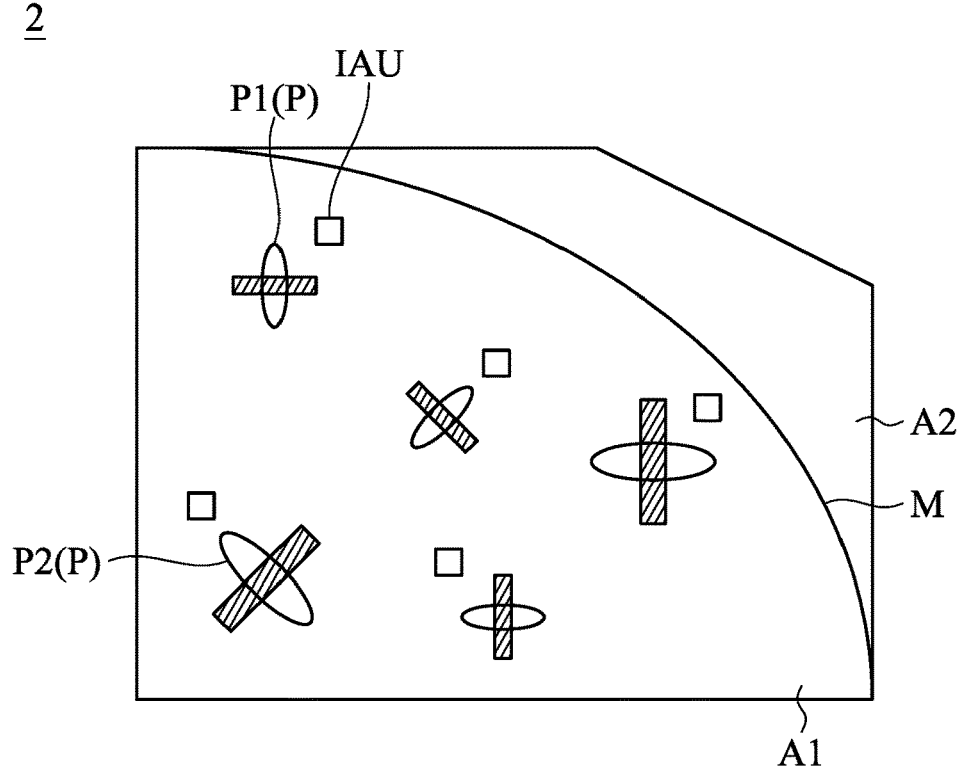
FIG. 6 is a schematic top view of a control panel of a radiation device according to Embodiment 2 of the present disclosure.

FIG. 6 is a schematic top view of a control panel 2 of a radiation device according to Embodiment 2 of the present disclosure. In Embodiment 1, the ion attraction unit IAU is disposed in the non-active area A2. However, as shown in FIG. 6, the ion attraction unit IAU may also be disposed in the active area A1 and corresponding to the modulation unit P.

According to the radiation device of Embodiment 2, the ion attraction unit IAU is disposed adjacent to the adjustable unit P to more effectively attract the mobile ions around the adjustable unit P, so as to reduce the interference caused by the mobile ions to enhance the performance of the radiation device.

Figure 7:
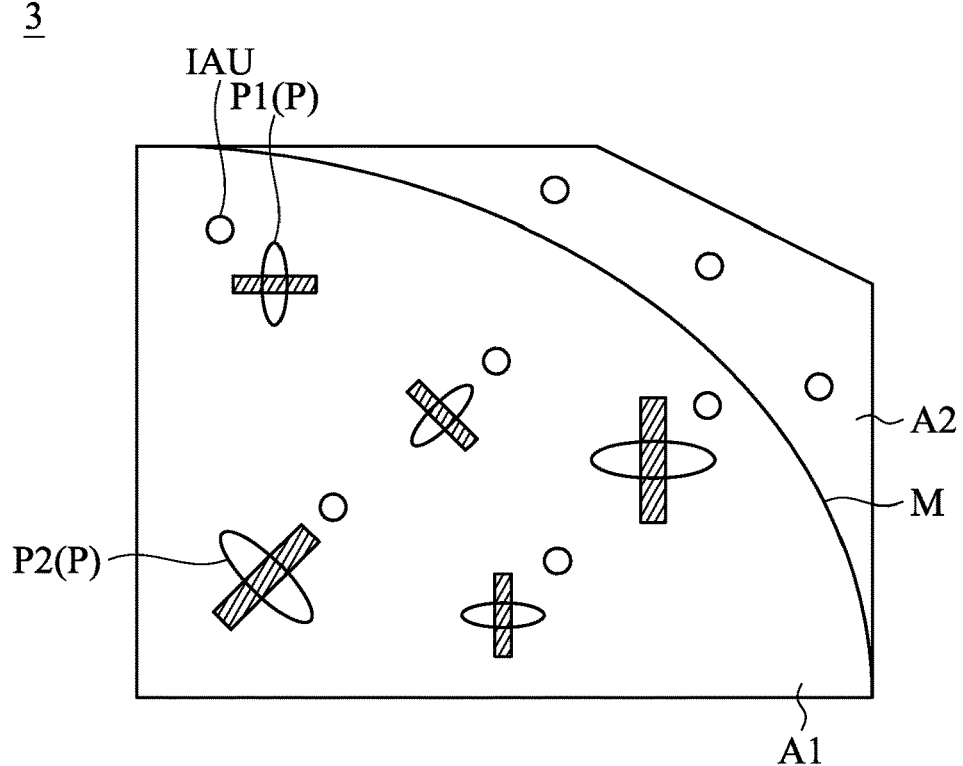
FIG. 7 is a schematic top view of a control panel of a radiation device according to Embodiment 3 of the present disclosure.

FIG. 7 is a schematic top view of a control panel 3 of a radiation device according to Embodiment 3 of the present disclosure. In Embodiments 1 and 2, the ion attraction unit IAU is rectangular in the top view. However, as shown in FIG. 7, the ion attraction unit IAU may be circular in the top view. In Embodiment 3, the ion attraction unit IAU may be disposed in the non-active area A2, and may also be disposed in the active area A1 corresponding to the modulation unit P.

In the disclosure, the shape of the ion attraction unit IAU in the top view is not limited. In addition to the rectangle and the circle, the shape of the ion attraction unit IAU can also be designed into other suitable shapes such as ellipse, polygon and the like according to the actual layout. The disclosure is not limited thereto.

Figure 8A:
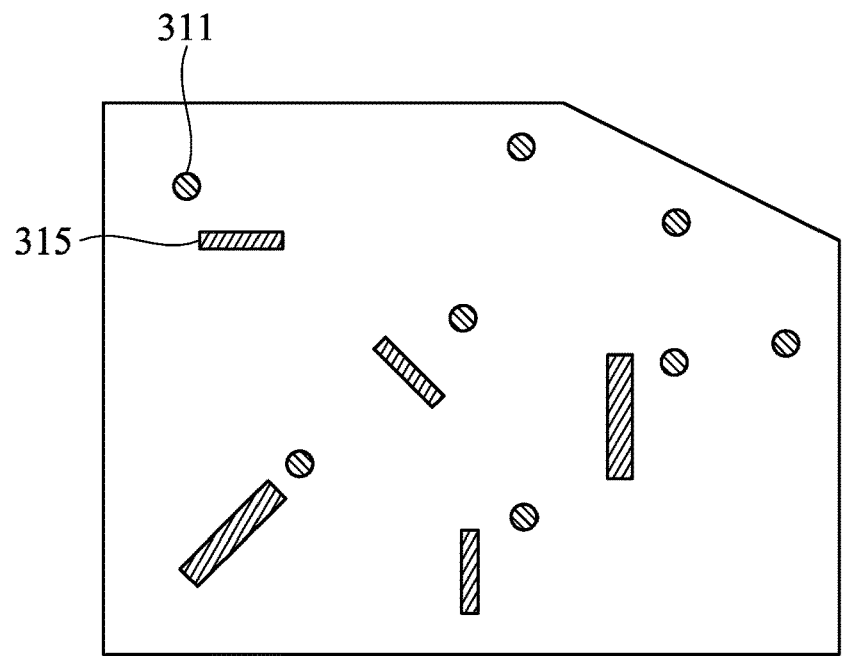
FIG. 8A is a schematic top view of a first substrate of the control panel of the radiation device according to Embodiment 3 of the present disclosure.
Figure 8B:
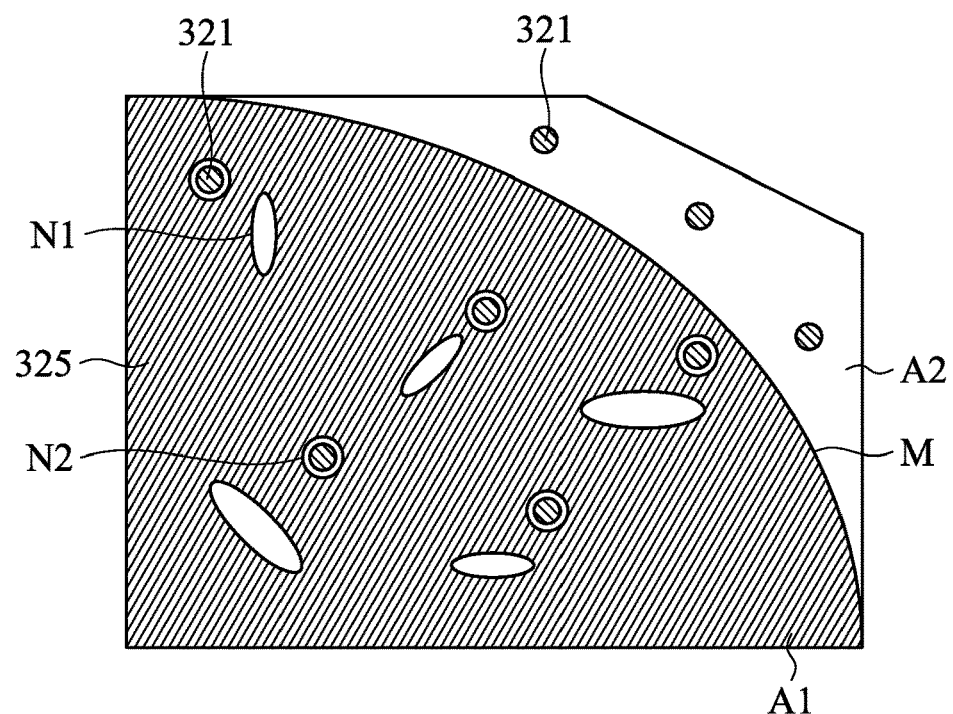
FIG. 8B is a schematic top view of a second substrate of the control panel of the radiation device according to Embodiment 3 of the present disclosure.

FIG. 8A is a schematic top view of a first substrate of the control panel of the radiation device according to Embodiment 3 of the present disclosure. FIG. 8B is a schematic top view of a second substrate of the control panel of the radiation device according to Embodiment 3 of the present disclosure. The control panel 3 may include a first substrate 31, a second substrate 32, and a dielectric layer 33 (not shown). In FIG. 8A, a first electrode 315 may be formed on the first substrate 31 at a position corresponding to the modulation unit P, and a first attraction electrode 311 may be formed at a position corresponding to the ion attraction unit IAU. In FIG. 8B, on the second substrate 32, a second electrode 325 is formed in the active area A1. The second electrode 325 has a first opening N1. The first opening N1 corresponds to the first electrode 315 of the modulation unit P, and the first opening N1 and the first electrode 315 overlap in a normal direction of the first substrate 31. In addition, the second electrode 325 may have a second opening N2, and the second opening N2 has a second attraction electrode 321 therein. The second opening N2 may correspond to the first attraction electrode 311 of the ion attraction unit IAU. The second opening N2 and the first attraction electrode 311 of the ion attraction unit IAU overlap in the normal direction of the first substrate 31. In the non-active area A2, the second attraction electrode 321 is formed at a position corresponding to the ion attraction unit IAU.

Figure 9:
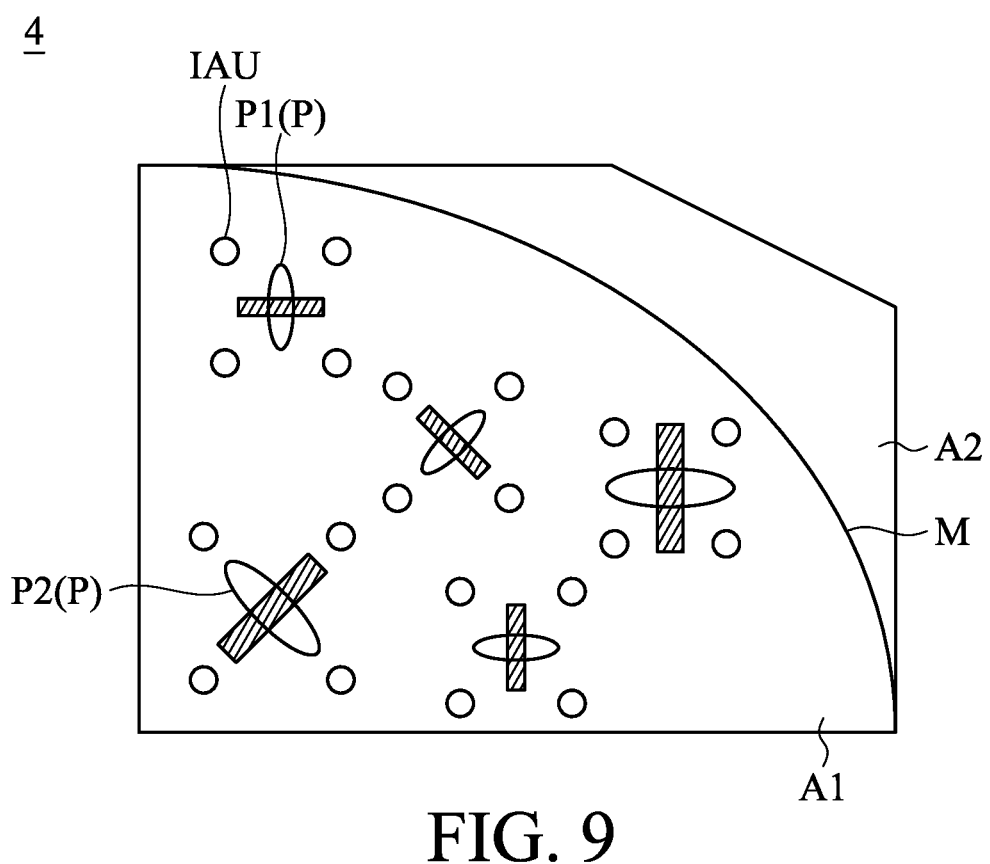
FIG. 9 is a schematic top view of a control panel of a radiation device according to Embodiment 4 of the present disclosure.

FIG. 9 is a schematic top view of a control panel 4 of a radiation device according to Embodiment 4 of the present disclosure. In Embodiments 2 and 3, one modulation unit P may be disposed adjacent to one ion attraction unit IAU. However, as shown in FIG. 9, one modulation unit P may be disposed adjacent to the plurality of ion attraction units IAU. In this embodiment, the ion attraction units IAU corresponding to one of the modulation units P have the same shape. However, in other embodiments, the ion attraction units IAU corresponding to the modulation unit P may have different shapes, different sizes, or different positions, which is not limited herein.

Figure 10:
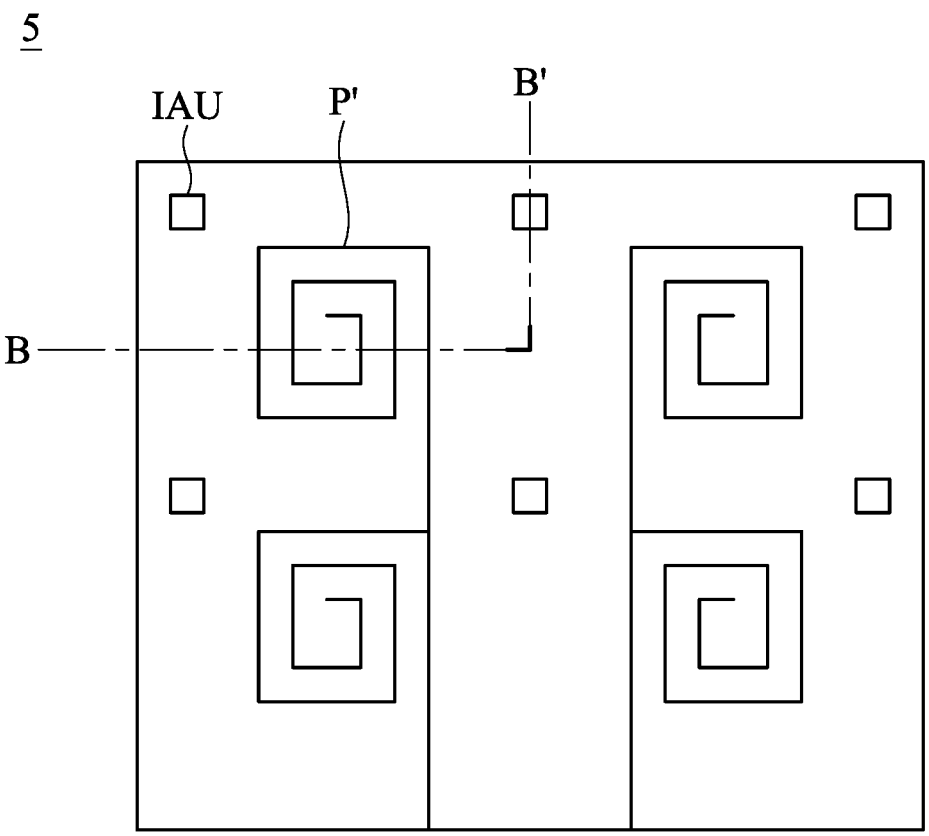
FIG. 10 is a schematic top view of a control panel of a radiation device according to Embodiment 5 of the present disclosure.
Figure 11:
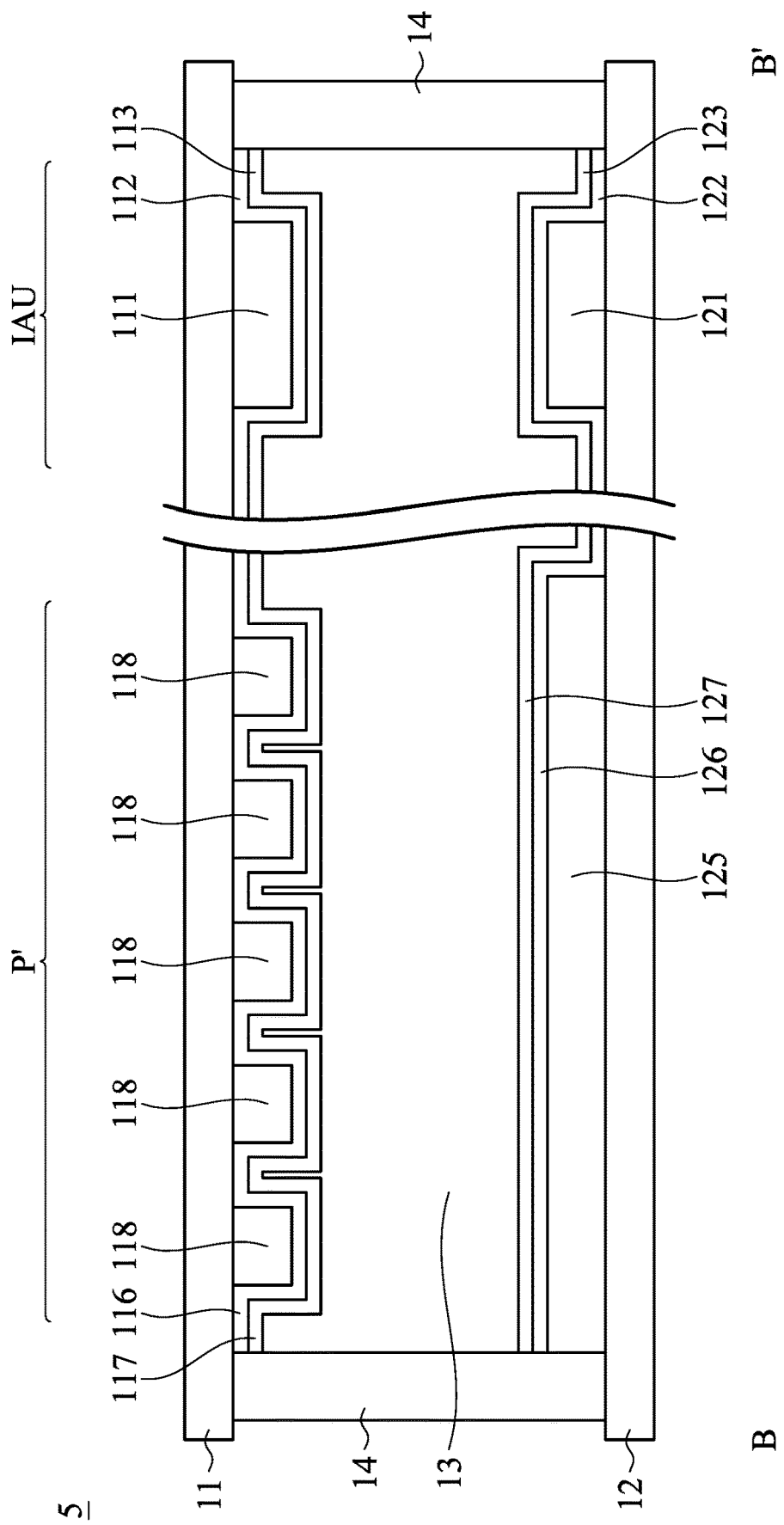
FIG. 11 is a sectional view taken along line B-B' of the control panel of the radiation device according to Embodiment 5 of the present disclosure.

FIG. 10 is a schematic top view of a control panel 5 of a radiation device according to Embodiment 5 of the present disclosure. FIG. 11 is a sectional view taken along line B-B' of the control panel 5 of the radiation device according to Embodiment 5 of the present disclosure. In Embodiment 5, the active area of the control panel 5 may substantially correspond to the position of the first electrode 118, while the remaining portion may be defined as a non-active area. Modulation units P' are designed differently from those in the first to fourth embodiments. As shown in FIGS. 10 and 11, the first electrode 118 of the modulation unit P' formed on the first substrate 11 is, for example, a spiral. The ion attraction unit IAU is disposed corresponding to the modulation unit P'. Except for this, the other configurations and operations of the control panel 5 are similar to those of the control panels of Embodiments 1 to 4. In this embodiment, the ion attraction unit IAU is disposed in a non-active area.

Figure 12:
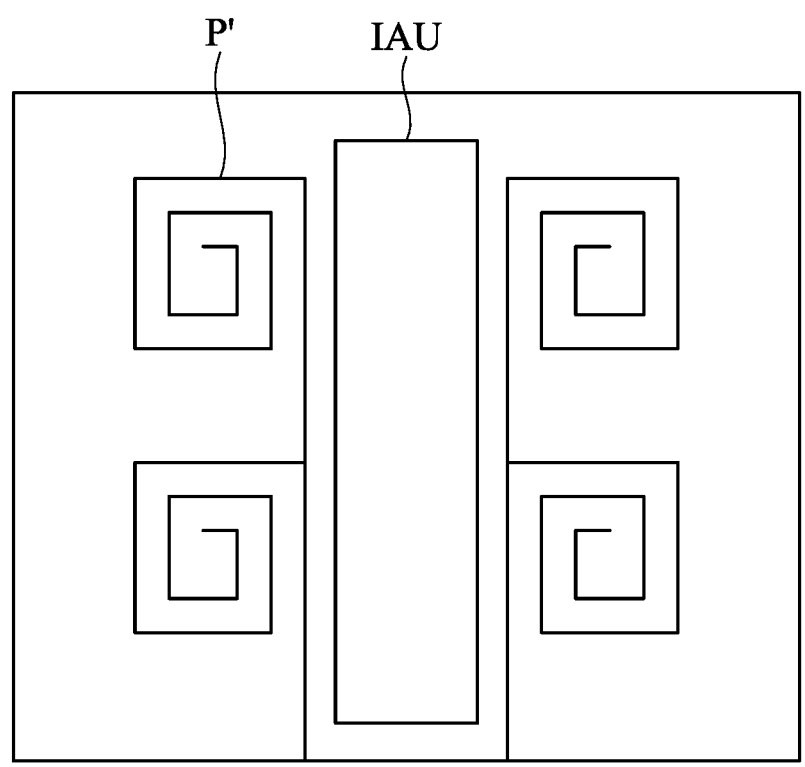
FIG. 12 is a schematic top view of a control panel of a radiation device according to Embodiment 6 of the present disclosure.

FIG. 12 is a schematic top view of a control panel 6 of a radiation device according to Embodiment 6 of the present disclosure. In Embodiment 6, the area of the ion attraction unit IAU is larger than that in Embodiment 5. As shown in FIG. 12, the ion attraction unit IAU is, for example, of a rectangular configuration, and is disposed corresponding to at least one modulation cell P'. In this embodiment, the ion attraction unit IAU is correspondingly disposed between the four modulation units P' to attract the mobile ions so as to reduce the interference with the modulation unit P'.

Figure 13:
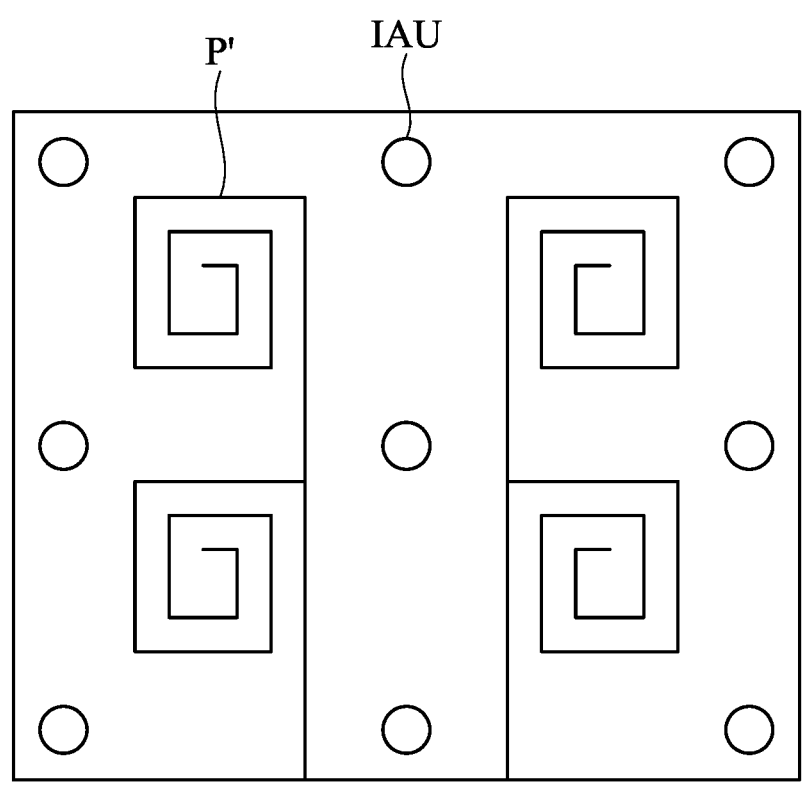
FIG. 13 is a schematic top view of a control panel of a radiation device according to Embodiment 7 of the present disclosure.

FIG. 13 is a schematic top view of a control panel 7 of a radiation device according to Embodiment 7 of the present disclosure. In Embodiment 5 of FIG. 10, the ion attraction unit IAU is rectangular in the top view. However, as shown in FIG. 13, the ion attraction unit IAU may be circular in the top view. In Embodiment 7, the plurality of ion attraction units IAU may be evenly distributed on the control panel 7 and disposed adjacent to at least one modulation unit P'. In the present disclosure, the shape of the ion attraction unit IAU in the top view is not limited. In addition to the rectangle and the circle, the ion attraction unit IAU may also be designed with other suitable shapes such as an ellipse, a polygon and the like in accordance with the actual layout. In the present disclosure, the ion attraction units IAU corresponding to the modulation units P' may be different shapes, different sizes, or different positions, which is not limited herein.

According to each of the above embodiments, the present disclosure provides a radiation device (or a control panel) having an ion attraction unit for attracting excess mobile ions, thereby enhancing the performance of the radiation device.

The above-disclosed features can be combined, modified, substituted, or diverted to one or more of the disclosed embodiments in any suitable manner without being limited to a specific embodiment.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A radiation device, comprising
   a control panel having an active area and a non-active area, wherein the control panel comprises:
   a first modulation unit disposed in the active area, and
   an ion attraction unit disposed in at least one of the active area and the non-active area, wherein the ion attraction unit is electrically insulated from the first modulation unit,
   wherein the control panel comprises a first substrate, a second substrate, and a dielectric layer, wherein the first substrate is disposed opposite to the second substrate, and the dielectric layer is located between the first substrate and the second substrate.

2. The radiation device as claimed in claim 1, wherein the ion attraction unit comprises:
   a first alignment layer disposed on a surface of the first substrate that is adjacent to the dielectric layer;
   a first attraction electrode disposed between the first substrate and the first alignment layer;
   a second alignment layer disposed on a surface of the second substrate that is adjacent to the dielectric layer; and
   a second attraction electrode disposed between the second substrate and the second alignment layer,
   wherein the first attraction electrode and the second attraction electrode overlap in a normal direction of the first substrate.

3. The radiation device as claimed in claim 2, wherein the ion attraction unit further comprises:
   a first insulating layer disposed between the first attraction electrode and the first alignment layer; and
   a second insulating layer disposed between the second attraction electrode and the second alignment layer.

4. The radiation device as claimed in claim 1, wherein the ion attraction unit comprises:
   a first alignment layer disposed on a surface of the first substrate that is adjacent to the dielectric layer;
   a second alignment layer disposed on a surface of the second substrate that is adjacent to the dielectric layer; and
   a first attraction electrode and a second attraction electrode which are disposed between the first substrate and the first alignment layer or between the second substrate and the second alignment layer.

5. The radiation device as claimed in claim 1, wherein the first modulation unit comprises:
a third alignment layer disposed on a surface of the first substrate that is adjacent to the dielectric layer;
a first electrode disposed between the first substrate and the third alignment layer;
a fourth alignment layer disposed on a surface of the second substrate that is adjacent to the dielectric layer; and
a second electrode disposed between the second substrate and the fourth alignment layer,
wherein the first electrode and the second electrode overlap in a normal direction of the first substrate.

6. The radiation device as claimed in claim 5, wherein the second electrode has a second opening, and the second opening and the ion attraction unit overlap in the normal direction of the first substrate.

7. The radiation device as claimed in claim 5, wherein the second electrode has a first opening, and the first opening and the first electrode overlap in the normal direction of the first substrate.

8. The radiation device as claimed in claim 1, wherein the dielectric layer comprises liquid crystals.

9. The radiation device as claimed in claim 1, further comprising
a second modulation unit disposed in the active area,
wherein the sizes of the first modulation unit and the second modulation unit are different.

10. A control panel, comprising
an active area and a non-active area;
a first modulation unit disposed in the active area, and
an ion attraction unit disposed in at least one of the active area and the non-active area, wherein the ion attraction unit is electrically insulated from the first modulation unit,
wherein the control panel further comprises a first substrate, a second substrate, and a dielectric layer, wherein the first substrate is disposed opposite to the second substrate, and the dielectric layer is located between the first substrate and the second substrate.

11. The control panel as claimed in claim 10, wherein the ion attraction unit comprises:
a first alignment layer disposed on a surface of the first substrate that is adjacent to the dielectric layer;
a first attraction electrode disposed between the first substrate and the first alignment layer;
a second alignment layer disposed on a surface of the second substrate that is adjacent to the dielectric layer; and
a second attraction electrode disposed between the second substrate and the second alignment layer,
wherein the first attraction electrode and the second attraction electrode overlap in a normal direction of the first substrate.

12. The control panel as claimed in claim 11, wherein the ion attraction unit further comprises:
a first insulating layer disposed between the first attraction electrode and the first alignment layer; and
a second insulating layer disposed between the second attraction electrode and the second alignment layer.

13. The control panel as claimed in claim 10, wherein the ion attraction unit comprises:
a first alignment layer disposed on a surface of the first substrate that is adjacent to the dielectric layer;
a second alignment layer disposed on a surface of the second substrate that is adjacent to the dielectric layer; and
a first attraction electrode and a second attraction electrode which are disposed between the first substrate and the first alignment layer or between the second substrate and the second alignment layer.

14. The control panel as claimed in claim 10, wherein the first modulation unit comprises:
a third alignment layer disposed on a surface of the first substrate that is adjacent to the dielectric layer;
a first electrode disposed between the first substrate and the third alignment layer;
a fourth alignment layer disposed on a surface of the second substrate that is adjacent to the dielectric layer; and
a second electrode disposed between the second substrate and the fourth alignment layer,
wherein the first electrode and the second electrode overlap in a normal direction of the first substrate.

15. The control panel as claimed in claim 14, wherein the second electrode has a first opening, and the first opening and the first electrode overlap in the normal direction of the first substrate.

16. The control panel as claimed in claim 14, wherein the second electrode has a second opening, and the second opening and the ion attraction unit overlap in the normal direction of the first substrate.

17. The control panel as claimed in claim 10, wherein the dielectric layer comprises liquid crystals.

18. The control panel as claimed in claim 10, further comprising
a second modulation unit disposed in the active area,
wherein the sizes of the first modulation unit and the second modulation unit are different.

* * * * *